US011645354B2

United States Patent
Quan et al.

(10) Patent No.: US 11,645,354 B2
(45) Date of Patent: May 9, 2023

(54) DETERMINATION METHOD FOR PREFERRED HABITAT OF FISH AND TERMINAL DEVICE

(71) Applicant: XI'AN UNIVERSITY OF TECHNOLOGY, Xi'an (CN)

(72) Inventors: Quan Quan, Xi'an (CN); Shaoze Gao, Xi'an (CN); Simin Yang, Xi'an (CN); Rong Fan, Xi'an (CN)

(73) Assignee: XI'AN UNIVERSITY OF TECHNOLOGY, Xi'an (CN)

( * ) Notice: Subject to any disclaimer, the term of this patent is extended or adjusted under 35 U.S.C. 154(b) by 0 days.

(21) Appl. No.: 17/750,027

(22) Filed: May 20, 2022

(65) Prior Publication Data

US 2023/0102365 A1 Mar. 30, 2023

Related U.S. Application Data

(63) Continuation of application No. PCT/CN2022/071244, filed on Jan. 11, 2022.

(30) Foreign Application Priority Data

Sep. 23, 2021 (CN) .......................... 202111110237.1

(51) Int. Cl.
  *G06F 17/00* (2019.01)
  *G06F 30/20* (2020.01)
  *G06F 30/10* (2020.01)
(52) U.S. Cl.
  CPC .............. *G06F 17/00* (2013.01); *G06F 30/10* (2020.01); *G06F 30/20* (2020.01)

(58) Field of Classification Search
  CPC .......... G06F 30/10; G06F 30/20; G06F 17/00
  See application file for complete search history.

(56) References Cited

U.S. PATENT DOCUMENTS 6,160,759 A * 12/2000 Nestler ................. G01V 1/003
  367/139
7,681,531 B2 * 3/2010 O'Neil .................. A01K 29/00
  119/428

(Continued)

FOREIGN PATENT DOCUMENTS

| AU | 2020103130 A4 | 1/2021 | |
| CN | 109271694 A * | 1/2019 | .............. G06F 17/11 |
| CN | 109271694 A | 1/2019 | |

(Continued)

*Primary Examiner* — Vincent H Tran

(57) ABSTRACT

The present invention discloses a determination method for a preferred habitat of fish and a terminal device, wherein the method comprises: acquiring parameter information of a water environment in which target fish is located, and establishing a 3D water environment model by utilizing the parameter information of the water environment; determining an ecological function of the target fish and constructing a bio-simulation model on the 3D water environment model by combining the ecological function; acquiring a movement locus of the target fish in the bio-simulation model and determining potential habitats of the target fish according to the movement locus; and determining the preferred habitat of the target fish from the potential habitats by utilizing a preference learning model based on a density accumulation method.

6 Claims, 3 Drawing Sheets

(56) References Cited

U.S. PATENT DOCUMENTS

2011/0213515 A1* 9/2011 Haymart ................ G06F 16/29
707/769
2018/0347133 A1 12/2018 Chen et al.

FOREIGN PATENT DOCUMENTS

| CN | 109615076 | A | 4/2019 |
| CN | 109657940 | A | 4/2019 |
| CN | 112215116 | A | 1/2021 |
| JP | 2008185455 | A | 8/2008 |
| JP | 2013116092 | A | 6/2013 |
| JP | 6401411 | B1 | 10/2018 |
| WO | WO2017156443 | A1 | 9/2017 |
| WO | WO2021014339 | A1 | 1/2021 |

* cited by examiner

DETERMINATION METHOD FOR PREFERRED HABITAT OF FISH AND TERMINAL DEVICE

CROSS-REFERENCE TO RELATED APPLICATIONS

The application claims priority to Chinese patent application No. 2021111102371, filed on Sep. 23, 2021, the entire contents of which are incorporated herein by reference.

TECHNICAL FIELD

The present invention discloses a determination method for a preferred habitat of fish and a terminal device, and belongs to the technical field of hydraulic engineering.

BACKGROUND

In the river ecosystem, fish is a main biological factor, and the growth and propagation of the fish have a close relationship with an aquatic environment of habitats. The fish has intense and quick reaction to the change of temperature in a living environment, which is an ideal indicator species for detecting and recording the influence of climate change to the freshwater ecosystem. In recent years, due to large-scale development and utilization of rivers, the native states of the rivers, such as hydrological regime, hydrodynamic force and a water environment are changed, the environment of the habitats of the fish is damaged, and the survival of the fish is threatened. The research on the habitats of the fish has the significance of better understanding the influence of the construction of reservoirs to the river ecosystem and is also an important means of protection for fish resources.

When a damaged habitat is restored by adopting the prior art, all the habitats are restored. However, the fish has preference for the selection of the habitats, the utilization rate of some habitats is not high, and the restoration cost of all the habitats is higher.

SUMMARY

The present application aims to provide a determination method for a preferred habitat of fish and a terminal device, which can be used for restoring the habitat targetedly, so as to solve the existing technical problem that the restoration cost of the habitat is high.

A first aspect of the present invention provides the determination method for the preferred habitat of the fish, which comprises:

acquiring parameter information of a water environment in which target fish is located, and establishing a 3D water environment model by utilizing the parameter information of the water environment;

determining an ecological function of the target fish and constructing a bio-simulation model on the 3D water environment model by combining the ecological function;

acquiring a movement locus of the target fish in the bio-simulation model and determining potential habitats of the target fish according to the movement locus; and determining the preferred habitat of the target fish from the potential habitats by utilizing a preference learning model based on a density accumulation method.

Preferably, the ecological function comprises a growth function, a schooling function and a foraging function.

Preferably, the growth function is determined according to a first formula, and the first formula is $$\begin{cases} l_t = L_\infty \cdot [1 - e^{-k(t-t_0)}] \\ W_t = W_\infty \cdot [1 - e^{-k(t-t_0)}]^3 \end{cases}$$

In the formula, $l_t$ represents the average body length of the target fish at the moment t; $W_t$ represents the average weight of the target fish at the moment t; $L_\infty$ represents the average progressive body length of the target fish; $W_\infty$ represents the average progressive weight of the target fish; k represents a growth coefficient; and $t_0$ represents the hypothetical theoretical growth starting age.

Preferably, the schooling function is determined according to a second formula, and the second formula is $$D_{i,t+1} = \lambda_1 D_{i,t} + \lambda_2 D_{i,t}' + \lambda_3 D_{i,t}'' + \lambda_4 D_{i,t}'''$$

In the formula, $D_{i,t+1}$ represents the movement direction of an $i^{th}$ target fish individual at the moment t+1; $D_{i,t}$ represents the movement direction of the $i^{th}$ target fish individual at the moment t; $D_{i,t}'$ represents the direction of the average position from the $i^{th}$ target fish individual to adjacent individuals at the moment t; $D_{i,t}''$ represents the average direction of the adjacent individuals of the $i^{th}$ target fish individual at the moment t; $D_{i,t}'''$ represents the average value of the directions from the adjacent individuals, the distance of which is less than a preset safe distance, to the $i^{th}$ target fish individual at the moment t; $\lambda_1$, $\lambda_2$, $\lambda_3$, $\lambda_4$ represent weight; and $\lambda_1+\lambda_2+\lambda_3+\lambda_4=1$.

Preferably, the foraging function is determined according to a third formula, and the third formula is eat=if(fixed<0.1,0,fixed::−(0.1*fixed))

In the formula, fixed represents a bait concentration.

Preferably, acquiring the movement locus of the target fish in the bio-simulation model specifically comprises:

acquiring the movement locus of the target fish in the bio-simulation model according to a fourth formula, wherein the fourth formula is $$\begin{cases} \begin{bmatrix} x_{i,t+1} \\ y_{i,t+1} \end{bmatrix} = \begin{bmatrix} x_{i,t} \\ y_{i,t} \end{bmatrix} + S_{i,t} \begin{bmatrix} \sin(\theta_{i,t} + \varphi) \\ \cos(\theta_{i,t} + \varphi) \end{bmatrix} \\ S_{i,t} = \sqrt{(x_{i,t+1} - x_{i,t})^2 + (y_{i,t+1} - y_{i,t})^2} \end{cases}$$

In the formula, $$\begin{bmatrix} x_{i,t} \\ y_{i,t} \end{bmatrix}$$

represents the position, at which an $i^{th}$ species of target fish is located at the moment t;

$$\begin{bmatrix} x_{i,t+1} \\ y_{i,t+1} \end{bmatrix}$$

represents the position, at which the $i^{th}$ species of target fish is located at the moment t+1; x and Y represent a horizontal axis and a vertical axis in a Cartesian coordinate system; $S_{i,t}$ represents the movement speed of the $i^{th}$ target fish individual at the moment t; $D_{i,t}$ represents the movement direction of the $i^{th}$ target fish individual at the moment t; $\theta_{i,t}$ represents an included angle when the movement direction of the $i^{th}$ target fish individual at the moment t is $D_{i,t}$; $\varphi$ represents displacement declination; and $S_{i,t} \in (0, S_{max})$, wherein $S_{max}$ represents the maximum movement speed of the target fish in a time period from the moment t to the moment t+1.

Preferably, the movement speed and the movement direction of the target fish individual are determined according to a fifth formula, and the fifth formula is $$\begin{cases} D_{i,t} = D\_fav(t) + D\_flee(t) \\ S_{i,t} = S\_fav(t) + S\_flee(t) \end{cases}$$

In the formula, represents the movement speed of the $i^{th}$ target fish individual at the moment t; $D_{i,t}$ represents the movement direction of the $i^{th}$ target fish individual at the moment t; D_fav(t) and S_fav(t) respectively represent the movement direction of the position of the preferred flow velocity of the $i^{th}$ target fish individual at the moment t within the perception range thereof relative to a current position and the movement speed towards the movement direction; and D_flee(t) and S_flee(t) respectively represent the movement direction of the $i^{th}$ target fish individual which flees from a nearest individual within the perception range thereof at the moment t and the movement speed that the $i^{th}$ target fish individual flees from the movement direction.

Preferably, a determination method for the perception range comprises:

acquiring visual information, auditory information and olfactory information of the target fish; and determining the perception range of the target fish according to the visual information, the auditory information and the olfactory information.

Preferably, determining the preferred habitat of the target fish from the potential habitats by utilizing the preference learning model based on the density accumulation method specifically comprises:

acquiring a preference value of the $i^{th}$ species of target fish for each potential habitat by utilizing the preference learning model based on the density accumulation method; and determining the preference learning model based on the density accumulation method according to a sixth formula, wherein the sixth formula is $$Pop_j = \frac{P_{ij}}{\sum_{j=1}^{k} P_j}$$

In the formula, $P_{ij}$ represents the accumulated density that the $i^{th}$ species of target fish appears in a $j^{th}$ potential habitat, which is marked as the preference value; and $\Sigma_{j=1}^{k} P_j$ represents the total accumulated density that the target fish appears in all the potential habitats; and determining the preferred habitat of the target fish according to the preference value.

A second aspect of the present invention provides a terminal device, comprising a memory, a processor and a computer program which is stored in the memory and can operate in the processor; and the processor realizes the steps of the above method when executing the computer program.

Compared with the prior art, the determination method for the preferred habitat of the fish and the terminal device of the present invention have the following beneficial effects:

According to the determination method for the preferred habitat of the fish of the present invention, the preferred habitat of the fish can be determined, so as to carry out targeted restoration, so that the living environment of the fish is ensured, and the restoration cost of the habitat is reduced.

DETAILED DESCRIPTION OF THE EMBODIMENTS

Figure 1:
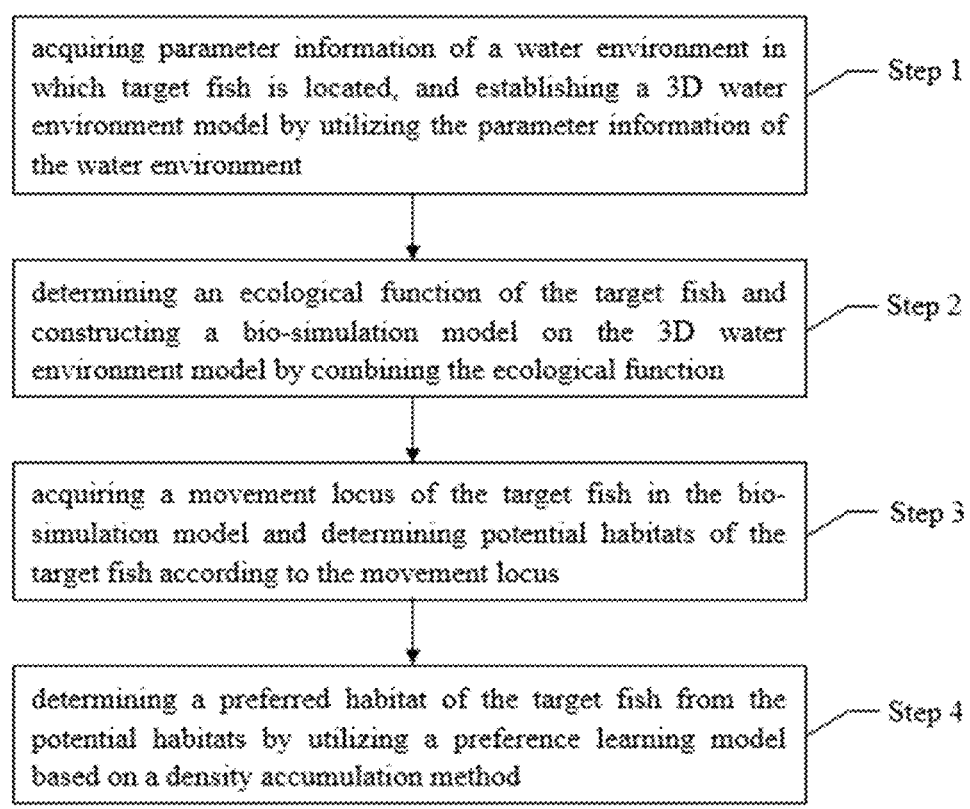
FIG. 1 is a flow chart of a determination method for a preferred habitat of fish, which is provided by the present invention.

A first aspect of the present invention provides a determination method for a preferred habitat of fish, which is shown in FIG. 1 and comprises:

Step 1, acquiring parameter information of a water environment in which target fish is located, and establishing a 3D water environment model by utilizing the parameter information of the water environment, which specifically comprises:

Step 1.1, acquiring the parameter information of the water environment, such as zone boundary conditions, underwater topography data, actually measured water level, water temperature, water quality, water velocity and the like of the water environment in which target fish is located;

Step 1.2, establishing the 3D water environment model by utilizing the parameter information of the water environment, wherein exemplarily, the 3D water environment model is established by utilizing an MIKE 3 FM module in an MIKE series of software;

after the 3D water environment model is established, analog information corresponding to the parameter information of the water environment can be acquired from the model, and the above analog information and the 3D water environment model provide a platform for construction of a bio-simulation model;

Step 2, determining an ecological function of the target fish and constructing the bio-simulation model on the 3D water environment model by combining the ecological function, which specifically comprises:

Step 2.1, determining a growth function, a schooling function and a foraging function, which specifically comprises:

Step 2.1.1, acquiring observation data in long-term domestication of the target fish and ecological research data;

Step 2.1.2, according to the observation data in the long-term domestication and the ecological research data, determining ecological characteristics of the target fish, and establishing the growth function, the schooling function and the foraging function according to the ecological characteristics of the target fish, wherein the growth function is determined according to a first formula, and the first formula is $$\begin{cases} l_t = L_\infty \cdot [1 - e^{-k(t-t_0)}] \\ W_t = W_\infty \cdot [1 - e^{-k(t-t_0)}]^3 \end{cases}$$

In the formula, $l_t$ represents the average body length of the target fish at the moment t; $W_t$ represents the average weight of the target fish at the moment t; $l_\infty$ represents the average progressive body length of the target fish; $W_\infty$ represents the average progressive weight of the target fish; k represents a growth coefficient; and $t_0$ represents the hypothetical theoretical growth starting age;

the schooling function is determined according to a second formula, and the second formula is $$D_{i,t+1} = \lambda_1 D_{i,t} + \lambda_2 D_{i,t}' + \lambda_3 D_{i,t}'' + \lambda_4 D_{i,t}'''$$

In the formula, $D_{i,t+1}$ represents the movement direction of an $i^{th}$ target fish individual at the moment t+1; $D_{i,t}$ represents the movement direction of the $i^{th}$ target fish individual at the moment t; $D_{i,t}'$ represents the direction of the average position from the $i^{th}$ target fish individual to adjacent individuals at the moment t; $D_{i,t}''$ represents the average direction of the adjacent individuals of the $i^{th}$ target fish individual at the moment t; $D_{i,t}'''$ represents the average value (avoiding obstacles) of the directions from the adjacent individuals, the distance of which is less than a preset safe distance, to the $i^{th}$ target fish individual at the moment t; with the consideration of different influences to the fish, all the directions need to be weighted, a weighted mean is obtained, and the weight can be determined according to preference; $\lambda_1$, $\lambda_2$, $\lambda_3$, $\lambda_4$ represent weight; and $\lambda_1 + \lambda_2 + \lambda_3 + \lambda_4 = 1$;

the foraging function is determined according to a third formula, and the third formula is $$eat = if(fixed < 0.1, 0, fixed :: -(0.1 * fixed))$$

In the formula, fixed represents a bait concentration;

a selection function of a weight growth mode of the target fish is $$G = Fixed * 0.01 * area$$

In the formula, fixed represents the bait concentration, and area represents the unit grid area;

Step 2.2, constructing the bio-simulation model on the 3D water environment model by combining the growth function, the schooling function and the foraging function, wherein exemplarily, the constructed bio-simulation model is an ABM; and the method for determining the preferred habitat of the target fish in the present invention is used for determining the preferred habitat of the target fish on the bio-simulation model;

Step 3, acquiring a movement locus of the target fish in the bio-simulation model and determining potential habitats of the target fish according to the movement locus, which specifically comprises:

Step 3.1, acquiring the movement locus of the target fish in the bio-simulation model according to a fourth formula, wherein the fourth formula is $$\begin{cases} \begin{bmatrix} x_{i,t+1} \\ y_{i,t+1} \end{bmatrix} = \begin{bmatrix} x_{i,t} \\ y_{i,t} \end{bmatrix} + S_{i,t} \begin{bmatrix} \sin(\theta_{i,t} + \varphi) \\ \cos(\theta_{i,t} + \varphi) \end{bmatrix} \\ S_{i,t} = \sqrt{(x_{i,t+1} - x_{i,t})^2 + (y_{i,t+1} - y_{i,t})^2} \end{cases}$$

In the formula, $$\begin{bmatrix} x_{i,t} \\ y_{i,t} \end{bmatrix}$$

represents the position, at which an $i^{th}$ species of target fish is located at the moment t;

$$\begin{bmatrix} x_{i,t+1} \\ y_{i,t+1} \end{bmatrix}$$

represents the position, at which the $i^{th}$ species of target fish is located at the moment t+1; x and Y represent a horizontal axis and a vertical axis in a Cartesian coordinate system; $S_{i,t}$ represents the movement speed of the $i^{th}$ target fish individual at the moment t; $D_{i,t}$ represents the movement direction of the $i^{th}$ target fish individual at the moment t; $\theta_{i,t}$ represents an included angle when the movement direction of the $i^{th}$ target fish individual at the moment t is $D_{i,t}$; $\varphi$ represents displacement declination; and $S_{i,t} \in (0, S_{max})$ wherein $S_{max}$ represents the maximum movement speed of the target fish in a time period from the moment t to the moment t+1;

wherein the movement speed and the movement direction of the target fish individual are determined according to a fifth formula, and the fifth formula is $$\begin{cases} D_{i,t} = D\_fav(t) + D\_flee(t) \\ S_{i,t} = S\_fav(t) + S\_flee(t) \end{cases}$$

In the formula, $S_{i,t}$ represents the movement speed of the $i^{th}$ target fish individual at the moment t; $D_{i,t}$ represents the movement direction of the $i^{th}$ target fish individual at the moment t; D_fav(t) and S_fav(t) respectively represent the movement direction of the position of the preferred flow velocity of the $i^{th}$ target fish individual at the moment t within the perception range thereof relative to a current position and the movement speed towards the movement direction; and D_flee(t) and S_flee(t) respectively represent the movement direction of the $i^{th}$ target fish individual which flees from a nearest individual within the perception range thereof at the moment t and the movement speed that the $i^{th}$ target fish individual flees from the movement direction;

The above perception range is determined according to visual information, auditory information and olfactory information of the target fish, which specifically comprises:

acquiring the visual information, the auditory information and the olfactory information of the target fish, wherein the above information can be acquired according to experiments.

Exemplarily:

a, a determination experiment for the visual information of the target fish comprises:

carrying out training of conditioned reflex for experimental fish, and taking a flat plate drawn with stripes as a stimulating signal; displaying the stripe plate within the visual range of the fish, and immediately throwing baits into an aquarium; through two events of the stripe plate and food, training the fish to establish the conditioned reflex to the stripe plate; and after the conditioned reflex is established, for example, the fish shows an ingestion behavior, taking the ingestion behavior as the basis that the fish sees the stripe plate, and then conducting a determination experiment for the range of visibility of the fish, wherein the experiment indicates that the average range of visibility of the fish is 10 m; in the experiment, the range of visibility of the fish is recorded as 15 m, and the largest range of visibility of the fish reaches 30 m; and different species of fishes have different ranges of visibility, and the visual capacity of human reaches over 100 m under the same condition;

b, a determination experiment for the auditory information of the target fish comprises:

in the experiment, adopting an underwater speaker for shouting to a fish school at the position which is 50 cm under the water, wherein the average sound pressure is 90 db; the water surface illumination is 01-1lx; the average body length of fish bodies of the experimental fish school is 143 cm; and the average weight is 30 g; arranging a fluorescent lamp on a ship, wherein the distance from the lamp to the water surface is 2 m; gathering the fish by using the fluorescent lamp, and then shouting to the fish school in which about 30 fish is gathered, wherein in order to prevent generation of adaptability, single tones with approximate frequencies are avoided, namely, the frequencies of two adjacent sound waves have greater difference; and observing the reaction of the fish school after shouting, and conducting a next experiment until the fish school is all restored to be stable, wherein the experiment indicates that the fish school reacts most intensely to 900 Hz, which is followed by 950 Hz, 1050 Hz and 750 Hz;

c, a determination experiment for the olfactory information of the target fish comprises:

taking stones and baits wrapped by Zostera marina as experimental objects and observing the reaction of the fish, wherein the experiment finds that the fish has no reaction to the experimental objects wrapped with the stones; the fish can find and swallow the experimental objects wrapped with the baits in an average of 3 min; when nostrils of the fish are plugged by cotton, the fish does not have any reaction; and when the baits are thrown into the sea, the fish at the position which is 10 m under the water immediately swim to the baits.

The perception range of the target fish is determined according to the visual information, the auditory information and the olfactory information.

In the determination process, the visual information, the auditory information and the olfactory information can be comprehensively considered, and then the perception range of the target fish is determined.

For example, the visual information, the auditory information and the olfactory information, which are acquired through the above determination experiments, can be comprehensively considered, so as to obtain a result that the perception range of the target fish is 10 m; and different species of fishes have different perception ranges, and comprehensive consideration is needed according to determination results of the experiments;

Step 3.2, determining the potential habitats of the target fish according to the movement locus, which specifically comprises:

adopting a determination rule that places such as a river shoal, a gully, a water bay and the like with the straight-line distance to the movement locus of being less than a preset distance threshold are the potential habitats, wherein in the step, more potential habitats are obtained, and if all the potential habitats are restored, the restoration cost is higher; and Step 4, determining the preferred habitat of the target fish from the potential habitats by utilizing a preference learning model based on a density accumulation method, which specifically comprises:

Step 4.1, acquiring a preference value of the $i^{th}$ species of target fish for each potential habitat by utilizing the preference learning model based on the density accumulation method; and determining the preference learning model based on the density accumulation method according to a sixth formula, wherein the sixth formula is $$\text{Pop}_j = \frac{P_{ij}}{\sum_{j=1}^{k} P_j}$$

In the formula, $P_{ij}$ represents the accumulated density that the $i^{th}$ species of target fish appears in a $j^{th}$ potential habitat; and $\sum_{j=1}^{k} P_j$ represents the total accumulated density that the target fish appears in all the potential habitats; and setting the numerical value of $P_{ij}$ as the preference value of the $i^{th}$ species of target fish for each potential habitat;

Step 4.2, determining the preferred habitat of the target fish according to the preference value:

comparing the preference value and a preset preference threshold, and determining the potential habitat corresponding to the preference value which is more than the preset preference threshold as the preferred habitat of the target fish; and after the preferred habitat is obtained, restoring the preferred habitat of the target fish, so as to realize targeted restoration, so that the cost is reduced, the best restoration effect is achieved, and the living environment of the fish is ensured.

A second aspect of the present invention provides a terminal device, which comprises a memory, a processor and a computer program which is stored in the memory and can operate in the processor; and the processor is configured to execute the computer program to realize the above method.

The method of the present invention is described in details hereinafter by combining a more specific embodiment.

Figure 2:
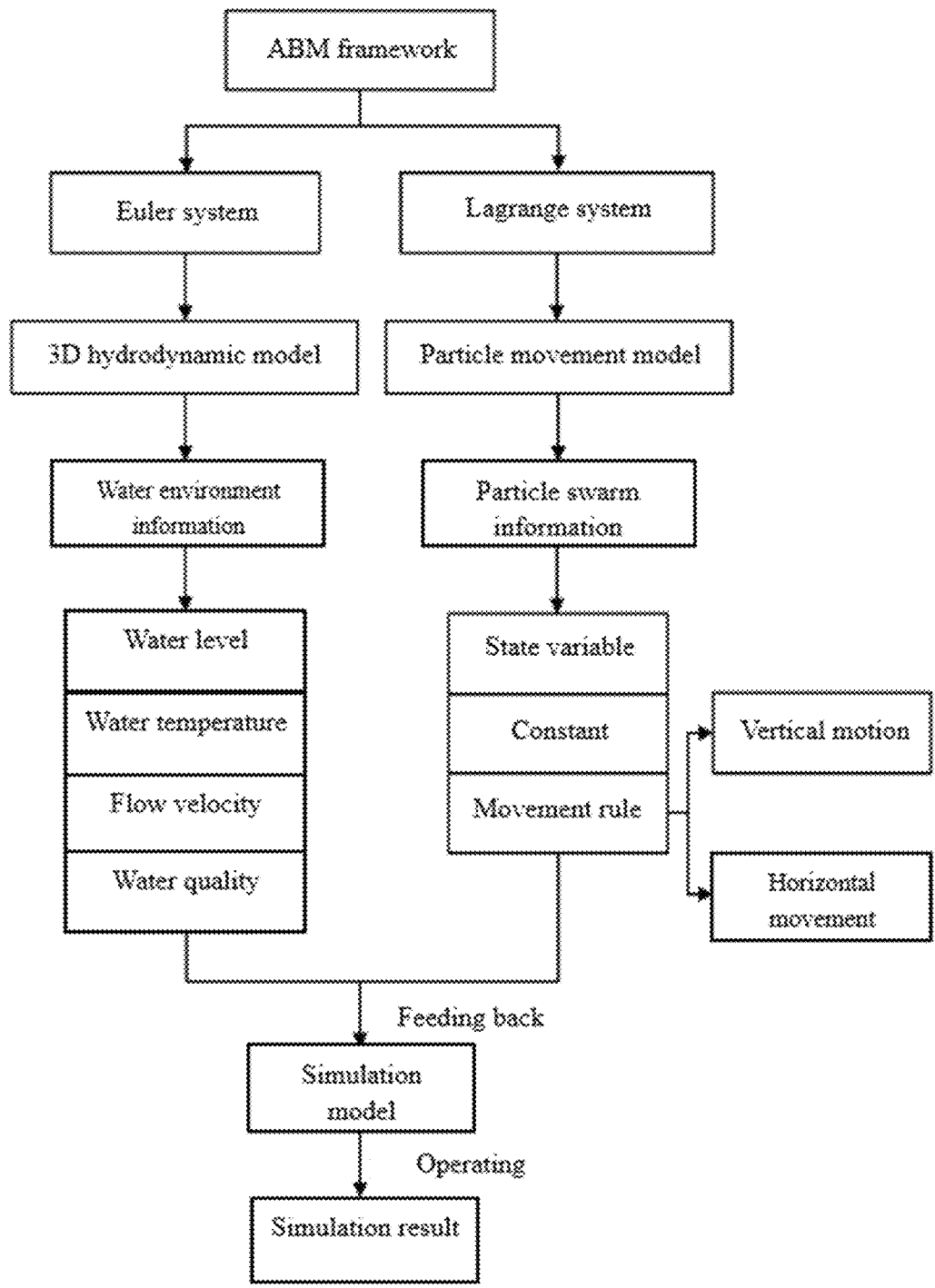
FIG. 2 is a structural schematic diagram of an ABM (Agent-based Model) in a specific embodiment of the present invention.

In the specific embodiment, an ABM is used for simulation, wherein a structure diagram of the ABM is shown in FIG. 2. The model is usually used for simulating behaviors and interactions of an autonomous agent and evaluating the influence of an autonomous individual to the whole system. The simulated agent in an ABM framework can actively take action in a specific environment according to different information and does not passively listen to an instruction. In the embodiment, the framework is composed of two layers: individuals and an environment; on one hand, an HD (Hydrodynamic Force) module and an AD (Advection Diffusion) module in a commercial software system Mike 21/3 FM developed by Danhua Hydraulic Environment Technology (Shanghai) Co., Ltd. are taken as the basis, and the HD module and the AD module are applied for calculation to obtain parameter information of a water environment, such as water depth, flow velocity, water level, temperature, salinity and the like; and on the other hand, the movement direction and the movement speed of the individual are defined according to environment variables within the perception radius range of fish, the positions of other individuals and the schooling movement, so as to obtain state variables, a process and a calculation formula of particles; and the particles are endowed with attributes.

The changes of key environmental factors are simulated, and then simulation results as well as a fish growth function relationship, a movement function relationship and so on are taken as input, so as to obtain a movement locus of proxy particles based on a Lagrange framework according to a response relationship of the fish to water environmental factors in an external environment established by taking grids as scales in an Euler framework.

Then, according to the model, the position, at which a target fish individual achieves through movement at the next moment, is calculated; individual behaviors and growth states of the fish are simulated; an improved fish individual behavior simulation model is proposed; a particle swarm is established based on the improved fish individual behavior simulation model, and each particle is endowed with different attributes; and all the individuals move according to the above rule, so that the dynamic changes of the spatial distribution of the fish in a whole river reach along with water environment conditions are obtained; accurate simulation for the behaviors such as growth, survival, reproduction and the like of a fish school in a research area is realized; and true information interactions of the individual behaviors and population distribution of the fish accurately reappear.

An environment, in which the above ABM is located, is an environment provided by an ECO Lab, and the environment is used for equation development, implementation and execution of a user on a 3D high-definition model Mike 21/3 FM. Based on the simulation for HD and AD, all parameters of water quality can be simulated well. Tab. 1 is setting of template parameters of the ABM and description of process expressions.

TABLE 1

Setting of Template (Fish Population) Parameters of ABM

| Symbol | Type | Expression/Default | Description |
|---|---|---|---|
| dummy | State variable | 0 | Proxy particle |
| fixed | | 0 | Bait concentration |
| wqts | Constant | 30 | WQ time step |
| hsp | Acting force | 0.2 | Horizontal flow velocity |
| hdir | | 0 | Horizontal flow direction |
| vsp | | 0 | Water velocity (m/s) |
| d | | 0.8 | Water depth (m) |
| area | | 100000 | Unit grid area |
| forcing | Process | 0 | Acting force |
| $l_t$ | Lagrange | $L_\infty \cdot [1-e^{-k(t-t0)}]$ | Body length |
| $W_t$ | state variable (population) | $W_\infty \cdot [1-e^{-k(t-t0)}]^3$ | Weight |
| mort | Lagrange constant (population) | 0.1 | Decline velocity (d) |
| AV_SP | Search function (population) | MAGNITUDE (MAX [own. Weight]) | Average interval velocity |
| EU_MAX | | MAGNITUDE (MAX [fixed]) | Euler concentration gradient |
| EU_DIR | | DIRECTION (MAX_ABSOLUTE [fixed]) | Euler direction gradient |
| randdir | Arithmetic expression | RAND ( ) *360 | Random direction |
| hordir | | ARCTAN2(5,1) | Flow direction |
| eat | (population) | IF (fixed < 0.1, 0, fixed: :-(0.1*fixed)) | Foraging velocity discriminant |
| ShowEUMX | | EU_MAX | Maximum Euler concentration discriminant |
| growth | | Fixed*0.01*area | Selection for weight growth mode |
| Horizontal Vector 1 | Direction (population) | randdir | Weak random movement of particles (Fish individuals randomly swing in an actual water body anytime and anywhere.) |
| | Velocity (population) | 1 | |
| Horizontal Vector 2 | Direction (population) | EU_DIR | Movement direction of particles (When the fixed gradient within the search range of the particles is greater than a foraging concentration gradient, the particles swim to the direction with the maximum bait concentration.) |
| | Velocity (population) | IF(EU_MAX >0.005, IF (fixed >= 0.2, 0.1, 0.5), 0) | |
| Horizontal Vector 3 | Direction (population) | hdir | Carrying out supplementing based on a second group of movement vectors (When the fixed gradient within the search range of the particles is less than a certain value, the particles move along with flow at a certain speed.) |
| | Velocity (population) | IF(EU_MAX > 0.005, 0, hsp*RAND ( )) | |
| Horizontal Vector 4 | Update Speed | IF (Swimming Behavior < 2, Avoid Speed, Swim Speed) * abs (N_Rand2(1, 0.01)); | Population movement of particles and avoidance for obstacles |
| | Swimming Behavior | IF (Dist To Nearest < 0, 3, if (Dist To Nearest < Avoid Range, 1, if (Dist To Nearest < Parallel Range, 2))) | |
| | Swim Speed | IF (Swimming Behavior < 3, max (Average Swim Speed, 0.05*Body Len), Body Len * abs (N_Rand2(1.5, 0.1))) | |
| | Update Direction + Avoid Wall SwimDir2 | IF (Swimming Behavior < 2, Avoid Dir2, SwimDir2) + U_RAND2(-5, 5) IF (Swimming Behavior < 3, Average SwimDir2, IF (Dist To Nearest < 0, [HDIR] + U_RAND2(5, 20), Dist To Nearest)) | |
| Downward Velocity | Vertical velocity (population) | vsp | The initial value is equal to the water velocity. |

In the embodiment, a preferred area determination model of target fish is constructed in the ABM framework by utilizing a Lagrange algorithm, and the research on the visual capacity, the hearing capacity and the olfactory capacity as well as related generated behaviors and swimming capacity and manners of the fish in a fish domestication experiment is combined, so as to obtain a preferred area of the target fish. In the model, the target fish is replaced by proxy fish particles, tracking for the proxy fish particles is a problem described in a Lagrange form, and an ordinary differential equation is solved by using a Newton's law of motion. Generally, the acting force on the particles can be divided into two types: one type is from an external field, and the other type is from the interaction of the particles. The movement of the fish has a population aggregation effect; and most fish populations have a periodical schooling behavior in a life cycle thereof and have a food chasing behavior from fries to adult fish.

The proxy fish particles take the food concentration as a first selection in a good bait area, which is presented as the foraging movement; and the proxy fish particles select the basic movement outside the good bait area, which is presented as: selecting the proper temperature firstly, then selecting the proper water depth, and selecting the proper flow velocity finally. The floating and swimming of particle individuals have the characteristics of active migration and movement; firstly, the particle individual randomly roams without restriction; the particle individual detours when obstacles appear on a line of advance, and can be induced if a positive condition appears; and through the judgment for the environment variables in the perception range, a restricted area is searched, and the advance direction is induced.

In a growing process of the fish individuals, the particles can reflect the habit at different phases from juvenile fish to adult fish, and different calculation functions need to be set for the fish individuals. The proxy particles are endowed with motion functions of a random rule, a certainty equation and a mixing rule as well as a growth function (size and weight), a foraging function (fixed) and a schooling function, so as to obtain a Lagrange-based dynamic model of the fish individuals.

In the embodiment, a von Bertalanffy growth equation based on a metabolism theory is adopted as the growth function:

$$\begin{cases} l_t = L_\infty \cdot [1 - e^{-k(t-t_0)}] \\ W_t = W_\infty \cdot [1 - e^{-k(t-t_0)}]^3 \end{cases}$$

In the formula, $l_t$ represents the average body length of the target fish at the moment t; $W_t$ represents the average weight of the target fish at the moment t; $l_\infty$ represents the average progressive body length of the target fish; $W_\infty$ represents the average progressive weight of the target fish; k represents a growth coefficient; and $t_0$ represents the hypothetical theoretical growth starting age.

The following formula is adopted as a selection for a weight growth mode of the target fish:

G=Fixed*0.01*area

In the formula, fixed represents the bait concentration, and area represents the unit grid area.

The characteristics of population movement of the target fish are presented as same direction, alignment, avoidance for the obstacles and so on, and a determination formula of the movement direction of the schooling movement is $D_{i,t+1} = \lambda_1 D_{i,t} + \lambda_2 D_{i,t}' + \lambda_3 D_{i,t}'' + \lambda_4 D_{i,t}'''$ In the formula, $D_{i,t+1}$ represents the movement direction of an $i^{th}$ target fish individual at the moment t+1; $D_{i,t}$ represents the movement direction of the $i^{th}$ target fish individual at the moment t; $D_{i,t}'$ represents the direction of the average position from the $i^{th}$ target fish individual to adjacent individuals at the moment t; $D_{i,t}''$ represents the average direction of the adjacent individuals of the $i^{th}$ target fish individual at the moment t; $D_{i,t}'''$ represents the average value (avoiding the obstacles) of the directions from the adjacent individuals, the distance of which is less than a preset safe distance, to the $i^{th}$ target fish individual at the moment t; with the consideration of different influences to the fish, all the directions need to be weighted, a weighted mean is obtained, and the weight can be determined according to preference; $\lambda_1$, $\lambda_2$, $\lambda_3$, $\lambda_4$ represent weight; and $\lambda_1+\lambda_2+\lambda_3+\lambda_4=1$ A foraging velocity discriminant is eat=if(fixed<0.1,0,fixed::−(0.1*fixed))

In the formula, fixed represents the bait concentration.

In a calculation manner of the ABM, the movement of proxies can be simultaneously influenced by various environmental factors, including the factors such as flow velocity, water depth, water temperature, water quality concentration and the like based on am Euler method and also including the mutual effect between other proxies and a current/target proxy based on a Lagrange method. Each time step is configured to act spatial displacement of a next time step; and if only depending on the preferred flow velocity thereof and the positions of the adjacent individuals (if fleeing from the nearest individual), the movement speed and direction of the current proxy, which are about to generate, are superposed results of movement speed vectors of the proxies, which are influenced respectively by the above two factors, which are shown in FIG. 3.

Figure 3:
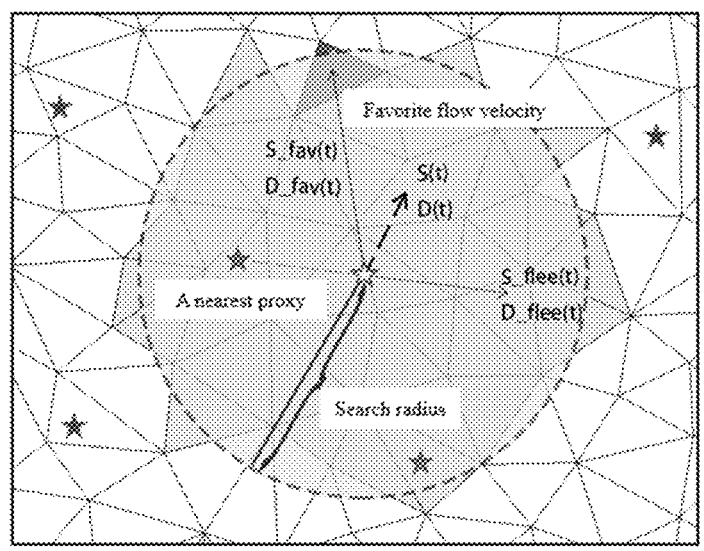
FIG. 3 is a schematic diagram of a movement rule of a proxy fish particle in the specific embodiment of the present invention.

In FIG. 3, five-pointed stars represent proxy fish particles, i.e. biological individuals; all grids contain flow velocity information; a dotted line circle represents the perception range of a certain proxy fish particle (a five-pointed star); the grid represents an Euler field environmental factor perceived by the proxy fish particle, such as flow velocity in the example, and the flow velocity contains favorite flow velocity (the preferred flow velocity of the fish individual generally has a certain value range.) of the proxy fish particle; and five-pointed stars outside the dotted line circle represent other proxy fish particles which are outside the perception range of the current proxy fish particle.

The movement speed of the proxy fish particle at the current moment is $S_t$, and the movement direction of the proxy fish particle at the current moment is $D_t$; and for the direction D_fav(t) that the grid in which the preferred flow velocity perceived within a search radius (the dotted line circle) by the proxy fish particle at the current moment is located, is relative to the own position of the proxy fish particle, and the movement speed S_fav(t) which is towards the direction, as well as the direction D_flee(t) that the proxy which is nearest to the proxy fish particle at the current moment and is perceived within the search radius (the dotted line circle) by the proxy fish particle at the current moment is relative to the own position, and the movement speed S_flee(t) that the proxy fish particle at the current moment flees from the direction, two groups of speed vectors are superposed and calculated to obtain the movement speed S(t) and the movement direction D(t) of the proxy at the current moment.

It is assumed that the position of a proxy fish particle individual i at a specific time step t is $$s_{it} = \begin{bmatrix} x_{i,t} \\ y_{i,t} \end{bmatrix},$$

wherein x and y represent Cartesian coordinates; location modeling at the moment t+1 is $$\begin{cases} \begin{bmatrix} x_{i,t+1} \\ y_{i,t+1} \end{bmatrix} = \begin{bmatrix} x_{i,t} \\ y_{i,t} \end{bmatrix} + S_{i,t} \begin{bmatrix} \sin(\theta_{i,t} + \varphi) \\ \cos(\theta_{i,t} + \varphi) \end{bmatrix} \\ S_{i,t} = \sqrt{(x_{i,t+1} - x_{i,t})^2 + (y_{i,t+1} - y_{i,t})^2} \end{cases}$$

In the formula, $$\begin{bmatrix} x_{i,t} \\ y_{i,t} \end{bmatrix}$$

represents the position, at which an $i^{th}$ species of target fish is located at the moment t;

$$\begin{bmatrix} x_{i,t+1} \\ y_{i,t+1} \end{bmatrix}$$

represents the position, at which the $i^{th}$ species of target fish is located at the moment t+1; x and Y represent a horizontal axis and a vertical axis in a Cartesian coordinate system; represents the movement speed of the $i^{th}$ target fish individual at the moment t; $D_{i,t}$ represents the movement direction of the $i^{th}$ target fish individual at the moment t; $\theta_{i,t}$ an included angle when the movement direction of the $i^{th}$ target fish individual at the moment t is $D_{i,t}$; $\varphi$ represents displacement declination; and $S_{i,t} \in (0, S_{max})$, wherein $S_{max}$ represents the maximum movement speed of the target fish in a time period from the moment t to the moment t+1;

The particles search preferred characteristic parameters of the fish, such as the maximum bait concentration, the proper temperature, the proper flow velocity and the like in an environment field calculated by the Euler method by taking the characteristics of life histories at different phases as priority, and another particle characteristic is added in the search parameters, thereby expanding simulation for a single individual in a fish behavior model. Finally, through information interaction of Euler-Lagrange in the ABM framework, a simulation technology of an 'exogenous environment-endogenous perception-fish school movement decision' is realized.

Next, a preference effect of the target fish is simulated.

The research on the change of the quantity of the target fish aims to understand the current situation of fish resources and predict the changing tendency thereof, so as to provide the scientific basis for management for aquatic fishing, fish multiplication and fishery resources. The change of the quantity of fish populations is caused by the change of environmental conditions, such as the change of fishing intensity, water temperature, hydrologic conditions of rivers, the fluctuation of the quantity of baits and other various factors, including the selection of a model, the design of the parameters, various biological characteristic values, understanding and estimating for an aging function, a weight function and a growth function, the quantity of resources of fries in a certain fishing ground, the influences of the environmental factors to the aggregation effect, migration and quantity of the populations, and so on. Therefore, in the embodiment, simulated calculation and analysis are carried out on a reproduction behavior, the aggregation effect and the consistency of the swimming direction of near-shore fries, so as to provide a certain scientific basis and support for the proliferative release of fish at habitats newly formed subsequently and the delimiting for the protection scope of a fish spawning area.

The dynamic state of the fish school is simulated by depending on a lot of observation and data accumulation, through adoption of a digital technology and a modeling technology, and by utilizing high capacity and high-speed computing power of a computer; the essence and main factors of a phenomenon are explored from the aspect of similarity; and the tendencies under various conditions are predicted. The preference $Pop_j$ of a proxy particle to a potential habitat j is $$Pop_j = \frac{P_{ij}}{\sum_{j=1}^{k} P_j}$$

wherein $P_{ij}$ represents the accumulated density that the $i^{th}$ species of target fish appears in a $j^{th}$ potential habitat; and $\sum_{j=1}^{k} P_j$ represents the total accumulated density that the target fish appears in all potential habitats.

The schooling behavior of the fries is emerged after the fries have swimming ability; a schooling form of the fries is changed constantly along with growing up of individuals; the schooling of the fries enables the fries to have the superiority to ecological adaptation, which is favorable to growth and survival of the individuals thereof. Through swimming in groups of the fish, the energy of the individuals can be conserved, and consumption is reduced; and when in swimming in a schooling form, leading fish is exchanged constantly, so that the energy consumption of the individuals is more uniform. The fries have the sense of safety in a schooling life, resting in a schooling form at night is one of presentations, and the fish in the group can quickly make a reaction to the change of the swimming speed of adjacent partners and can escape flexibly and simultaneously. The schooling behavior is conductive to ingestion of the fish and avoidance for the obstacles; plankton is gathered into a mass sometimes; single-tail fish enters an agglomerated area and is flustered; secondary schooled fish enters the area; the consistency of the swimming speed and the swimming direction is conductive to preying the plankton; and the plankton can be flexibly surrounded, so as to be beneficial to improvement of the survival rate of the fries.

Fries hatched just do not have the schooling behavior, and the schooling behavior is gradually emerged after the fries have the swimming ability. It is known from the survival time and the swimming trajectory of the fries that, the living area of the fries in groups is within a certain scope, which accords with a phenomenon that the gathering of the fries is found at a slow flow area of shallow water of the shoreside; and meanwhile, the fries have the feature of preying attached plants such as mosses and the like, and the plankton on the side wall of the shoreside, and an effect of avoiding obstacles on the side wall is reflected.

According to the method of the present invention, the preferred habitat of the fish can be determined, so as to carry out targeted restoration, so that the living environment of the fish is ensured, and the restoration cost of the habitat is reduced.

What is claimed is:

1. A determination method for a preferred habitat of fish, comprising:
configuring a computer program, the computer program is stored in a non-transitory memory and is executed by a processor, wherein the processor realizes the steps of:
acquiring parameter information of a water environment in which target fish is located, and establishing a 3D water environment model by utilizing the parameter information of the water environment; 5
determining an ecological function of the target fish and constructing a bio-simulation model on the 3D water environment model by combining the ecological function;

acquiring a movement locus of the target fish in the bio-simulation model, specifically comprising:

acquiring the movement locus of the target fish in the bio-simulation model according 10 to a fourth formula, wherein the fourth formula is $$\begin{cases} \begin{bmatrix} x_{i,t+1} \\ y_{i,t+1} \end{bmatrix} = \begin{bmatrix} x_{i,t} \\ y_{i,t} \end{bmatrix} + S_{i,t} \begin{bmatrix} \sin(\theta_{i,t} + \varphi) \\ \cos(\theta_{i,t} + \varphi) \end{bmatrix} \\ S_{i,t} = \sqrt{(x_{i,t+1} - x_{i,t})^2 + (y_{i,t+1} - y_{i,t})^2} \end{cases}$$

in the formula, $$\begin{bmatrix} x_{i,t} \\ y_{i,t} \end{bmatrix}$$

represents the position, at which an $i^{th}$ species of target fish is; located at the moment t;

$$\begin{bmatrix} x_{i,t+1} \\ y_{i,t+1} \end{bmatrix}$$

represents the position, at which the $i^{th}$; species of target fish is located at the moment t+1; x and y represent a horizontal axis and a vertical axis in a Cartesian coordinate system; $s_{ij}$ represents a movement speed of the $i^{th}$ target fish individual at the moment t; $D_{i,t}$ represents the movement direction of the $i^{th}$ target fish individual at the moment t; $\theta_{i,t}$ represents an included angle when the movement direction of the $i^{th}$ target fish individual at the moment t is $D_{i,t}$; φ is represents displacement declination; and $S_{i,t} \in (0, S_{max})$, wherein $S_{max}$ represents a maximum movement 20 speed of the target fish in a time period from the moment t to the moment t+1 wherein the movement speed and the movement direction of the target fish individual are determined according to a fifth formula, and the fifth formula is $$\begin{cases} D_{i,t} = D\_fav(t) + D\_flee(t) \\ S_{i,t} = S\_fav(t) + S\_flee(t) \end{cases}$$

in the formula, D_fav(t) and S_fav(t) respectively represent the movement direction of the position of the preferred flow velocity of the i target fish individual at the moment t within a perception range thereof relative to a current position and the movement speed towards the movement direction; and D_flee(t) and S_flee(t) respectively represent the movement direction of the $i^{th}$ target fish individual which flees from a nearest individual within the perception range thereof at the moment and the movement speed that the $i^{th}$ target fish individual flees from the movement direction;

determining potential habitats of the target fish according to the movement locus;

determining a preferred habitat of the target fish from the potential habitats by utilizing a preference learning model based on a density accumulation method specifically comprises:

acquiring a preference value of the $i^{th}$ species of target fish for each potential habitat by utilizing i the preference learning model based on the density accumulation method; and determining the preference learning model based on a density accumulation method according to a sixth formula, wherein the sixth formula is $$Pop_j = \frac{P_{ij}}{\sum_{j=1}^{k} P_j}$$

in the formula, $P_{ij}$ represents the accumulated density that the $i^{th}$ species of target fish appears in a $j^{th}$ potential habitat, which is marked as a preference value; and $\Sigma_{j=1}^{k} P_j$ represents a total accumulated density that the target fish appears in all the potential habitats;

determining the preferred habitat of the target fish according to the preference value.

2. The method according to claim 1, wherein the ecological function comprises a growth function, a schooling function and a foraging function.

3. The method according to claim 2, wherein the growth function is determined according to a first formula, and the first formula is $$\begin{cases} l_t = L_\infty \cdot [1 - e^{-k(t-t_0)}] \\ W_t = W_\infty \cdot [1 - e^{-k(t-t_0)}]^3 \end{cases}$$

in the formula, $l_t$ represents the average body length of the target fish at the moment t; $W_t$ represents the average weight of the target fish at the moment t; $l_\infty$ represents the average progressive body length of the target fish; $W_\infty$ represents the average progressive weight of the target fish; k represents a growth coefficient; and $t_0$ represents the hypothetical theoretical growth starting age.

4. The method according to claim 3, wherein the schooling function is determined 10 according to a second formula, and the second formula is $$D_{i,t+1} = \lambda_1 D_{i,t} + \lambda_2 D_{i,t}' + \lambda_3 D_{i,t}'' + \lambda_4 D_{i,t}'''$$

in the formula, $D_{i,t+1}$ represents the movement direction of an $i^{th}$ target fish individual at the moment t+1; $D_{i,t}$ represents the movement direction of the $i^{th}$ target fish individual at the moment t; $D_{i,t}'$ represents the direction of the average position from the $i^{th}$ target fish individual to adjacent individuals at the moment t; $D_{i,t}''$ represents the average direction of the adjacent individuals of the $i^{th}$ target fish individual at the moment t; $D_{i,t}'''$ represents the average value of the directions from the adjacent individuals, the distance of which is less than a preset safe distance, to the $i^{th}$ target fish individual at the moment t; $\lambda_1$, $\lambda_2$, $\lambda_3$, $\lambda_4$ represent weight; and $\lambda_1 + \lambda_2 + \lambda_3 + \lambda_4 = 1$.

5. The method according to claim 4, wherein the foraging function is determined according to a third formula, and the third formula is eat=if(fixed<0.1,0,fixed::−(0.1*fixed))

in the formula, fixed represents a bait concentration.

6. The method according to claim 1, wherein a determination method for the perception range comprises:

acquiring visual information, auditory information and olfactory information of the target fish; and determining the perception range of the target fish according to the visual information, 5 the auditory information and the olfactory information.

* * * * *